Patented Oct. 9, 1951

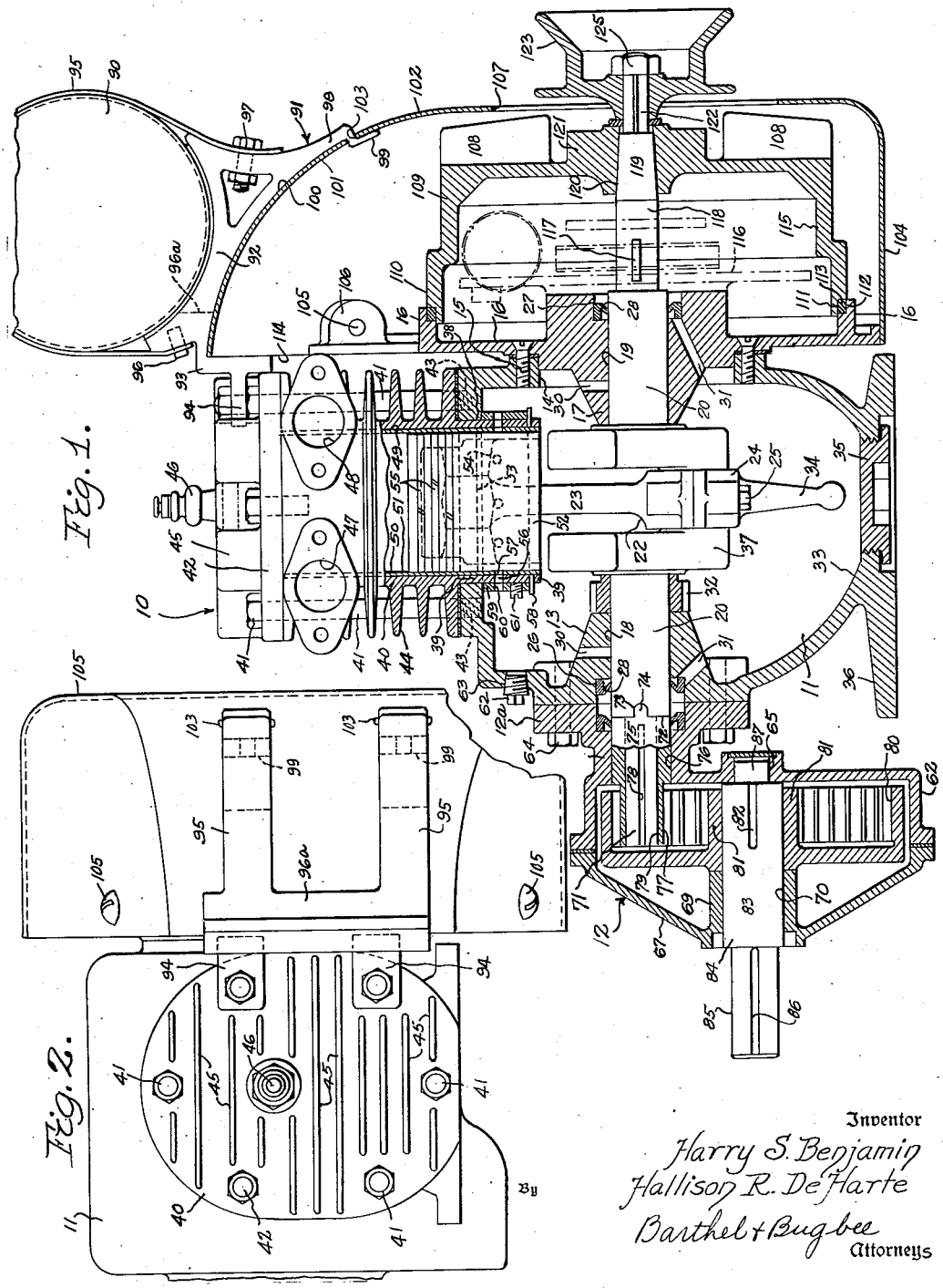

2,570,424

UNITED STATES PATENT OFFICE 2,570,424

INTERNAL-COMBUSTION ENGINE PISTON LUBRICATION

Harry S. Benjamin, Detroit, and Hallison R. De Harte, Farmington, Mich., assignors to The Leading Engine Company, Farmington, Mich., a corporation of Michigan Application August 31, 1948, Serial No. 47,038

2 Claims. (Cl. 184—18)

1

This invention relates to internal combustion engines.

The object of this invention is to provide an internal combustion engine wherein the piston is lubricated, according to the conditions of use, by providing the cylinder with a skirt which extends downward into the crankcase and has holes therethrough for transmitting oil splashed thereon to the piston, the number and location and sizes of the holes as adjusted by a lubricant regulator encircling the cylinder skirt determining the amount of lubricant reaching the piston, an engine which is used in a hot climate or under severe load conditions requiring more lubricant than an engine used for light duty or in a cool climate.

In the drawings:

Figure 1 is a central longitudinal section, partly in side elevation, through an internal combustion engine according to a preferred form of the invention; and Figure 2 is a top plan view of the right-hand portion of the engine shown in Figure 1.

Referring to the drawings in detail, Figure 1 shows, in longitudinal section, an internal combustion engine, generally designated 10, according to a preferred form of the invention. The engine 10 includes a crankcase 11, to which a reduction gear box generally designated 12 is adjustably secured, as described below, and constituting one aspect of the invention. The crankcase 11 is of hollow tank-like or box-like form with an inwardly-projecting bearing boss 13 on one side and an aperture 14 on the opposite side into which is bolted as at 15 an end plate 16 having an inwardly projecting bearing boss 17.

The bearing bosses 13 and 17 are provided with aligned co-axial bores 18 and 19 respectively rotatably supporting a crankshaft 20 having the usual crank pin 21 offset from the axis of the crankshaft 20 and engaged by the crank pin bearing 22 on the lower end of the connecting rod 23. The crankpin bearing 22 is closed by the usual bearing cap 24 of semi-circular form bolted thereto as at 25. The bearing bosses 13 and 17 are recessed as at 26 and 27 respectively to receive oil seals 28 and lubricant passages 30 and 31 are provided for conducting lubricant to and from the crankshaft 20. Mounted on the crankshaft 20 is a gear 32 which drives the cam shaft, the latter in turn operating the engine valves (not shown). The cam and valve mechanism are conventional and their details form no part of the present invention.

The bottom of the crankcase 11 is approxi-

2 mately bowl-shaped or semi-toroidal in order to provide a chamber or sump 33 which is approximately concentric with the axis of the crankshaft 20. In this manner, the crankshaft 20 is provided with a supply of oil regardless of whether the engine is tilted or is level. In order to lubricate the crank pin bearing 22, a scoop 34 mounted on the bearing cap 24 to throw the lubricant around by the splash system is used. The lower end of the chamber 33 is bored and threaded to receive a screw plug 35, and a mounting flange 36 is provided at the bottom thereof for mounting the engine 10 upon any suitable apparatus which it is to drive, for example, a power lawn-mower, a motor-scooter, portable generator, portable pump or "handy-billy."

The top of the crankcase 11 immediately above the crank portion 37 of the crankshaft 20 is provided with an aperture 38 into which a downwardly projecting skirt 39 of the engine cylinder 40 is secured, as by the bolts 41 which also pass through the cylinder head 42 and secure it and the cylinder 40 to the crankcase 11. The bolts 41 are threaded into threaded bores 43 in the top of the crankcase 11. The cylinder 40 is provided with heat-radiating and air-cooling fins 44 and the cylinder head 42 is similarly provided with fins 45. A spark plug 46 threaded through an aperture (not shown) in the top of the cylinder head 42 ignites the charge composed of a mixture of gasoline and air. The spark plug 46 is connected to a conventional ignition system (not shown). The incoming and outgoing gases are admitted and discharged through ports 47 and 48 to which are bolted the usual intake and exhaust manifolds (not shown).

The cylinder 40 and its skirt 39 are bored as at 49 to receive a cylinder liner 50 which in turn has a bore 51 receiving a piston 52. The latter is provided with a wrist pin 53 which passes through the wrist pin bearing 54 on the upper end of the connecting rod 23. The piston 52 is provided with piston rings 55 snugly engaging the bore 51. The liner 50 is preferably pressed into the bore 49 and secured therein by a press fit. In order to provide lubrication for the lower end of the cylinder liner bore 51, the skirt 39 and liner 50 are provided with a plurality of aligned holes 56 and 57 respectively. Rotatably mounted on the skirt 39 as by the pins 58 secured therein is an annular band or sleeve 59 having holes 60 aligned with the holes 56 and 57 (Figure 1). The sleeve 59 may be rotated slightly relatively to the skirt 39 to cause it to partly close the hole 56 so as to reduce the amount of oil entering them. The sleeve 59 is then clamped in its adjusted position by the set screw 61, access to which is obtained by a threaded plug 62 mounted in a threaded crankshaft opening 63.

The rearward end wall of the crankcase 11 adjacent the inwardly projecting boss 13 is flattened to receive the correspondingly flattened surface of the face plate 12a of the reduction gear box 12. The crankcase 11 and face plate 12a are drilled and threaded at intervals on equal radii to receive bolts 64 which are equidistant from the axis of the crankshaft 20. By this means, the face plate 12a may be swung to different positions and rebolted by reinserting the bolts 64 so as to differently position the gearbox 12 relatively to the axis of the crankshaft 20 and thereby adapt the engine to being mounted on different machines requiring different output shaft positions.

The reduction gear box 12 is bored centrally to provide a bearing bore 65 therein. Bolted as at 66 to the annular rim of the housing portion of the reduction gear box 12 is the correspondingly annular rim of the housing end plate 67 of the gearbox 12. The end plate 67 is roughly conical in shape and has an inwardly-extending bearing boss 69 provided with a bore 70 co-axial with the bore 65.

The crankshaft 20 at its rearward end is provided with a reduced diameter portion 71 (Figure 1), and the annular shoulder 72 therebetween is provided with notches 73. The notches 73 serve to receive correspondingly shaped tongues 74 which project axially from a tubular shaft 75 journaled in the bearing bore 76 of the neck portion 61 and carrying a pinion 77 at its outer end. The reduced diameter portion 71 of the crankshaft 20 is provided with a keyway or spline 78 for the reception of a pulley, sprocket, or the like when a direct drive is desired, with the reduction gearbox 12 completely removed. This type of drive, for example, is used in motor scooters. The hollow shaft 75 and its pinion 77 are provided with a bore 79 into which the reduced diameter crankshaft portion 71 smoothly fits.

Meshing with the pinion 77 is an internal ring gear 80, the hub 81 of which is keyed as at 82 to the central portion 83 of a reduction gearbox output shaft 84 having a reduced diameter portion 85 which is provided with a keyway or spline 86 for receiving a sprocket, pulley, coupling or the like. The central portion 83 of the output shaft 84 is journaled in the bearing bore 70 of the bearing boss 69 (Figure 1) whereas the reduced diameter inner end portion 87 is journaled in the bore 65 of the bearing boss 64. By this construction, the reduction gear box 12 is made completely removable by removing the bolts 64 and withdrawing the tubular shaft 75 from over the reduced diameter portion 71 of the crankshaft 20, at the same time withdrawing the tongues 74 from the notches 73 by which a driving connection is established between the tubular shaft 75 and the crankshaft 20. As previously explained, the face plate 59 can be rotated while the bolts 64 are removed, relocating the gearbox in another position, such as the chain line position shown in Figure 4.

The engine 10 is provided with a conventional carburetor which has been omitted to simplify the showing, and this is supplied with fuel through piping (not shown) leading to a fuel tank 90 of cylindrical form which rests in a cradle 91 having arcuate supporting portions 92 extending forwardly from bracket portions 93. The latter are provided with ears 94 which are bolted down by two of the cylinder head bolts 41. In order to hold the tank 90 in the cradle 91, there are provided two retaining bands or straps 95 secured as at 96 and 97 to the rearward and forward sides respectively of the cradle 91. The bands 95 are interconnected by a bridge portion 96a (Figure 2). The cradle 91 is also provided with forwardly and downwardly extending portions 98 terminating in offset tongues 99 and having arcuate lower surfaces 100 which are continuous with and form a part of the lower surfaces of the arcuate portions 92 (Figure 1).

Fitting upwardly beneath the arcuate surfaces 100 is a correspondingly arcuate top portion 101 (Figure 1) of a fan housing 102 having spaced slots 103 for receiving the offset tongues 99. The fan housing 102 is secured by the screws 105 to drilled and threaded bosses 106 distributed at intervals around the periphery of the end plate 16. The fan housing 102 is provided with a central aperture or fan air intake opening 107 through which air is drawn inward by the fan blades 108 mounted on the front wall of a cup-shaped flywheel 109, the rearward rim portion 110 of which is provided with an annular recess or stepped portion 111 located immediately adjacent a correspondingly stepped portion 112 inside the flange 16 (Figure 1). The portions 111 and 112 enclose an annular space receiving a sealing ring 113 whereby the joint between the rim portion 110 and the flange 16 is effectively sealed against the entrance of moisture, dust, or any other undesired foreign matter which may be drawn into the fan housing 102 through the opening 107. The air thus drawn in is discharged through an opening 114 in the rearward upward portion of the fan housing 102, so located as to discharge this cool air directly upon the cooling fins 44 and 45 of the cylinder 40 and cylinder head 42.

The hollow cup-shaped flywheel 109 is provided with an approximately cylindrical inner chamber 115 which is adapted to receive a conventional magneto indicated diagrammatically at 116 and having its rotor keyed or otherwise secured as at 117 to the forward reduced diameter portion 118 of the crankshaft 20. The latter in turn has a tapered portion 119 which is seated in a correspondingly tapered bore 120 in the hub 121 of the flywheel 109. The tapered portion 119 terminates in a keyed or splined reduced diameter portion 122 upon which is mounted a starting pulley 123 having oblique notches (not shown) which serve to receive the knotted end of a starting cable (not shown) wound on the pulley 123 for starting purposes. The outer end of the reduced diameter crankshaft portion 122 is threaded to receive a nut 125 (Figure 1) by which the pulley 123 is held in assembly on the crankshaft 20.

Prior to the operation of the engine 10, the reduction gearbox 12 is mounted in the most convenient location in the manner described in connection with the construction thereof, so that the output shaft portion 85 occupies the desired position. Let it be assumed that fuel is supplied to the tank 90 and high tension electricity to the spark plug 46 so that gasoline flows into the carburetor and is there mixed with the air to provide an explosive charge. The operator then winds the starting cable around the starting pulley 123 and by a pull on the cable rotates the pulley 123 and crankshaft 20. This action also spins the flywheel 109 and the rotor of the magneto 116, causing high-tension electricity to flow through the ignition system to the sparkplug 46, igniting the explosive charge without the cylinder bor 51.

The ignition of the explosive charge causes an explosion which drives the piston 52 downward, rotating the crankshaft 20. As sparks are caused to jump in timed relationship across the electrodes of the sparkplug 46 and the valves (not shown) are likewise operated in timed relationship by the cam shaft from the pinion 32, the crankshaft 20 is rotated continuously as long as fuel is supplied to the motor from the tank 90.

Meanwhile, the rotation of the flywheel 109 causes air to be drawn in through the air intake opening 107 by the fan blades 108 and discharged through the opening 114 over the cooling fins 41 and 45, cooling the cylinder 60 and cylinder head 42. The skirt 39 of the cylinder 40 is also cooled by oil splashed up by means of the scoop 34 from the sump 33 against it, and a portion of the oil passes through the holes 56, 57 into the lower end of the cylinder liner bore 51, to lubricate the piston 52. The holes 56, 57 are placed in number and location according to the kind of service and climate in which the engine is intended to operate. For a hot climate and very heavy duty, the holes 56, 57 are frequently spaced so as to provide a maximum of lubrication. For a cooler climate or light duty, the number of the holes or their diameters, or both, are correspondingly reduced. Regulation of the quantity of oil entering the holes 56, 57 is also obtained by adjusting the sleeve 59 to leave these holes completely open or partially close them.

After the engine has been in use for some time, the piston rings 55 become worn or lose their tension. As a result of this, oil is by-passed to the top of the piston and causes fouling of the spark plug and excess carbon around the exhaust valve. Ordinarily, new piston rings are installed to cure this condition. This expense can be eliminated or at least deferred for a while by adjusting the sleeve 59 to close the free aperture existing between the holes 60 and the holes 56, 57, thus reducing the amount of oil entering the cylinder, which amount would otherwise be in excess of that required for lubricating the cylinder walls. In this way, the pumping of oil would be reduced for the time being by cutting down the excess oil which would otherwise be pumped. The same adjustment also permits the engine to be adapted to widely varying running conditions, such as in the cold far north, on the one hand, and in hot deserts, on the other.

If at any time the flywheel 109 or magneto 116 requires servicing, the fan housing 102 may be easily removed by removing the screws 105 and tilting the housing 102, pressing it inward adjacent the tongues 99 and swinging it outward at the bottom so that the aperture 107 passes over the pulley 123. This can be done without disturbing any of the fuel or ignition lines, as is necessitated in similar work on prior engines.

What we claim is:

1. In an internal combustion engine, a crankcase, a chankshaft journaled in said crankcase, a cylinder mounted on said crankcase and having a skirt projecting into said crankcase, a piston reciprocably mounted in said cylinder and drivingly connected to said crankshaft, said skirt having lubricant passages therethrough, a lubricant regulator movably mounted on said skirt and having lubricant passages alignable with said skirt lubricant passages, and a lubricant distributor operatively connected to said crankshaft and arranged to direct lubricant against said skirt and into said passages.

2. In an internal combustion engine, a crankcase, a crankshaft journaled in said crankcase, a cylinder mounted on said crankcase and having a skirt projecting into said crankcase, a piston reciprocably mounted in said cylinder and drivingly connected to said crankshaft, said skirt having lubricant passages therethrough, a lubricant regulator comprising an annular band movably mounted on said skirt and having lubricant passages alignable with said skirt lubricant passages, and a lubricant distributor operatively connected to said crankshaft and arranged to direct lubricant against said skirt and into said passages.

HARRY S. BENJAMIN.
HALLISON R. DE HARTE.

REFERENCES CITED

The following references are of record in the file of this patent:

UNITED STATES PATENTS

| Number | Name | Date |
| --- | --- | --- |
| 1,071,781 | Nelson | Sept. 2, 1913 |
| 1,151,732 | Steedman | Aug. 31, 1915 |
| 1,167,970 | Balz | Jan. 11, 1916 |
| 1,364,102 | Forkner | Jan. 4, 1921 |
| 1,552,572 | Scannell | Sept. 8, 1925 |
| 1,591,346 | Tushaus | July 6, 1926 |
| 1,622,687 | Szekely | Mar. 29, 1927 |
| 2,250,809 | Martin et al. | July 29, 1941 |
| 2,256,601 | West | Sept. 23, 1941 |

FOREIGN PATENTS

| Number | Country | Date |
| --- | --- | --- |
| 492,407 | France | Mar. 18, 1919 |
| 269,938 | Great Britain | Apr. 25, 1927 |
| 652,509 | Germany | Nov. 2, 1937 |